United States Patent [19]
Decante

[11] Patent Number: 5,555,156
[45] Date of Patent: Sep. 10, 1996

[54] PROTECTIVE ENCLOSURE FOR A COMPUTER SYSTEM

[76] Inventor: Patrick Decante, 24 bis rue Rémy Laurent, 92260 Fontenay aux Roses, France

[21] Appl. No.: 232,223

[22] PCT Filed: Nov. 5, 1992

[86] PCT No.: PCT/FR92/01035

§ 371 Date: Jul. 19, 1994

§ 102(e) Date: Jul. 19, 1994

[87] PCT Pub. No.: WO93/09488

PCT Pub. Date: May 13, 1993

[30] Foreign Application Priority Data

Nov. 5, 1991 [FR] France ................... 91 13117

[51] Int. Cl.$^6$ .............. E05G 1/100; E05C 3/00; G06F 1/00
[52] U.S. Cl. .............. 361/683; 70/58; 340/825.31
[58] Field of Search .................. 70/58; 340/825.31; 312/223.2, 223.3, 223.6, 309; 361/683, 724

[56] References Cited

U.S. PATENT DOCUMENTS

| | | | |
|---|---|---|---|
| 4,818,986 | 4/1989 | Bauman | 340/825.31 |
| 4,972,182 | 11/1990 | Novik et al. | 340/825.32 |
| 5,299,862 | 4/1994 | Rankine | 312/329 |
| 5,389,919 | 2/1995 | Warren et al. | 340/825.31 |

FOREIGN PATENT DOCUMENTS

| | | | |
|---|---|---|---|
| 6928487 | 9/1987 | Australia | E05C 3/00 |
| 0235615 | 2/1987 | European Pat. Off. | G06F 1/00 |
| 8911024 | 9/1989 | Germany | E05G 1/100 |

*Primary Examiner*—Gerald P. Tolin
*Assistant Examiner*—Phuong T. Vu
*Attorney, Agent, or Firm*—Jacobson, Price, Holman & Stern, PLLC

[57] ABSTRACT

The invention relates to an apparatus which enables, via an elementary manipulation, protection against access to and destruction of data contained in a computer system or deactivation of such protection. The protected computer system may include a housing of a central processing unit (CPU) with its memories, the housing being separate from data access devices. The CPU and memories are connected to the data access devices by connectors which are external to the housing. The housing is defined by an enclosure (18) provided with at least one door or the like. Advantageously a plurality of housings may be defined in the enclosure, each of which housings can benefit from the inventive apparatus. Closing of the door causes a multipolar switch (28) to open, which switch is electrically connected between:

links connected to the data access devices located outside the housing;

connectors of/from the housing which connectors are to be protected.

The door can be closed while still permitting operation of the devices stored in the housing. Reopening of the door causes the contacts of the switch to close, and allows the exchange of data to resume.

7 Claims, 1 Drawing Sheet

PROTECTIVE ENCLOSURE FOR A COMPUTER SYSTEM

BACKGROUND OF THE INVENTION

The invention relates to protection of computer systems. More particularly, it relates to an apparatus which can be directly associated with a computer system prior to or during installation of the system, to protect the system against possible fraudulent use, damage, and/or tampering, by outside persons or influences.

Computers are currently in wide use, and consequently the information contained in them is increasingly important, as is the need to keep it confidential.

Accordingly, in most cases computer systems need reliable and effective means of protection. Examples of target systems are those operating in the scientific and security areas, and in offices involved in company management, such as accounting, payroll, inventory management, commercial trading, etc.

A great deal of study has been devoted to reliable prevention of: "leakage" of information, fraudulent use of information, and sabotage.

The research on data protection has been directed along two principal lines:

more or less complete physical protection of the computer system; and

"intellectual" protection of the contents of the computer system.

By "physical protection" is meant the use of an apparatus or other means which enable physical isolation of the parts of the system containing the information sought to be protected, or blocking of the physical means of access to such information. This type of apparatus or other means is intended to prevent theft or unauthorized use of information, and also any risk of damage by environmental influences such as heat, dust, fire, and/or water.

Cabinets, disk files, and other containers for diskettes, provided with a key lock or other entry control device, do not provide reliable mechanical resistance to unauthorized entry or use. Moreover, often they are stored in office rooms along with other documents without particular selectivity and without protection over and above that afforded to ordinary items. As a result, they can be easily removed by a thief, along with their contents, particularly since they generally are of small dimensions. Of course, the theft of the data storage media and containers themselves is generally not of high economic impact. Instead, the more serious impact results from the loss of information.

Operators regard these "protective" measures as onerous, and in practice the measures tend to be implemented only in the case of a prolonged absence of the operator.

It is also known to employ removable hard disks to store basic data. Their drawbacks are that they are costly and of generally low speed, and further that they only offer protection if stored in a reinforced cabinet at the end of each work session. The technique requires cumbersome manipulations, and necessitates interruption of work in progress. Consequently it tends to be employed only in the case of a prolonged absence, similarly to the abovementioned measures.

Other means of protection have been considered for specific applications, such as key means to lock the keyboard, anti-theft markings, brackets to fix equipment to the support on which it is held, etc. These types of protection are effective only under limited circumstances.

In this connection one might mention boxes and cabinets which are shielded and/or are provided with fire resistance means. These are generally used for storing disks, diskettes, cassettes, and magnetic tapes.

It would be impractical to also store the essential equipment (e.g. central processing unit (CPU), monitor, keyboard, etc.) in such enclosures.

Existing CPUs generally comprise a housing fixed to a chassis by screws, and have one or more front ports for diskette readers or cassette players. The connection between the keyboard and the CPU is established by a relatively simple key lock. Unfortunately, even if the key is used conscientiously to isolate the keyboard, the housing can be opened via the screws, and access thereby can be obtained to the interior components, particularly the switches. In this way, switches can be shorted to avoid the protective means; and no special equipment is needed for this. Furthermore, the described protection means are merely physical and only relate to the contents of the housing. Among other things, no specific protection is afforded to the printers.

With the aim of providing physical protection which is more comprehensive and effective, it has been proposed to enclose the computer and its associated elements in a special mobile container having a key lock. In this regard, Eur. OS 0,172,762 describes an assembly which is comprised of a plate on which the CPU and the computer monitor are disposed, and articulated walls which enable one to enclose the CPU, monitor, and keyboard in a container by folding-over the walls and sliding them toward the bottom of the container. When the operator wishes to begin work, he must "set up" his equipment, i.e. he must open the container, raise the CPU and monitor to the desired height, position the keyboard, and possibly position various retractable document support surfaces, etc. Then when finished working he must perform these operations in reverse; indeed, for effective protection the operations must be performed each time the operator leaves his post. It is seen that from the practical standpoint, the obstacles to success are formidable, because the sequence of operations is tedious and time-consuming, in addition to the fact that it interrupts work in progress.

Other furniture items and integrated computer stations have been proposed, but these too are time-consuming to implement. In general they have the same drawback that they leave the front panel free whereby the diskette- or cassette drive(s) can be accessed. This drawback of the formerly proposed systems is problematic in that, in the case of software-based protection systems, a person can evade the protection by interrupting and then reestablishing the power supply, causing the operating system to re-boot. The person can then intervene by inputting information.

To summarize: All of the known apparatuses intended to provide physical protection to a computer system are found to be time-consuming and impractical to use, and likewise fail to meet the esthetic criteria often desirable in a work environment. Moreover, their most important drawback is their limited effectiveness which owes to the fact that they still leave the operating system and/or the monitor and/or the printer accessible to unauthorized persons such as persons passing through the office.

Faced with these deficiencies, the approach of more recent studies has been to try to develop more advanced software-based protection. This type of protection is in the "intellectual protection" category mentioned above, in particular, neutralization of electronic access to the information.

"Intellectual protections" may be divided into three categories: apparatus employing a password, apparatus employing data encryption, and "anti-virus" programs.

In the first category, a password is employed to control access to an operating system or a given application, locally or on a network. This method of protection requires rigorous control. Experience shows that a password deemed secret tends to become known to numerous unauthorized persons, either because the password is simple (a date of birth, first name, etc.) or due to an annotation of the password which is accessible or is thinly disguised and thus easy to figure out, or even by reason of closeness to another password. In order to be properly effective, an apparatus employing passwords must require use of the password whenever the operator leaves his post. Thus for protection to be effective, the operator must terminate any operation in progress whenever he leaves his post. This is extremely constraining, and causes substantial loss of time, such that eventually the operator tends to only use the password when he will be absent for a prolonged period. Nonetheless, password protection is of value when combined with other means.

Data encryption means render data unintelligible by the ordinary means of the operating system. Their purpose is to protect the data proper but not the programs which process the data. Their preferred domain is thus the processing of data. Data encryption may also be employed to introduce a certain "resistance" to accidental loss of data. Nonetheless, the technique retards data transfer. Moreover, in order to be utilized, the equipment must be provided with an encryption algorithm and the codes therefor; this renders the method vulnerable and lowers the degree of security provided. Encryption has spawned a corps of decryption specialists who neutralize the encryption by employing mathematical decryption techniques. Accordingly, only relatively vulnerable encryption systems are currently in the public domain, while more sophisticated systems are reserved for very few specific applications such as defense classified information.

Recently, a new menace has appeared, the computer "virus". This is a program which "infects" existing programs in a given computer system. The "infection" can then be transmitted to other files. The deleterious effects of viruses can cause unexpected reactions in the system or the appearance of spurious messages. More seriously, viruses can partially or entirely destroy or modify data and programs. Viruses also can be devised to release confidential information to a spy. In order to guard against this new type of invasion and sabotage, "anti-virus" programs have been developed to protect computer systems by detecting the presence of viruses in executable files, under a regime of monitoring and control which can be varied to operate continually or upon command or upon each transfer of data to or from the outside, or systematically in the final phase of a system shutoff. However, these "anti-virus" programs only protect in specific cases—when the means for detecting of a virus have become known, the authors of the virus find new ways to evade such means.

Based on the preceding, it may be stated that protection software, which provides only "intellectual" and not physical protection, is vulnerable to evasion by specialists, be they professional or amateur. Nonetheless, protection software is a useful technique to be used in combination with other means, particularly when the system is connected to a network. However, the fact that such software is slow and is difficult and costly to adapt often serves to limit its application. In general, successful use of such software requires at least one computer programmer to deal with incompatibilities which can arise with the application software in use.

Eur. OS 0,235,615 discloses a security apparatus having a locking key on the housing of the CPU, which key operates a switch which blocks the diskette drive, thereby completely blocking operation of the computer.

Ger. Gbm. 89 11 024.2 teaches the concept of enclosing the CPU in a housing having openings for ventilation and for passage of connections. A trapdoor or sliding door providing access independent from that of the principal opening of the housing is provided to provide access to a key for starting the CPU, or access to a switch. The computer is allowed to function fully or not at all. There is no option of allowing the computer to operate without providing access to data.

The present invention remedies the above-described drawbacks by proposing an effective protective apparatus for computer systems, which apparatus is simple and easy to install and use, and which in particular enables protection from unauthorized access to data, but without interrupting operation of the CPU. It additionally enables protection of the hardware and other equipment against theft and against aggression by environmental influences such as heat, dust, fire, water, etc.

Toward this end, a principal feature of the present invention is a protective enclosure for a computer system, for protecting the computer system by confinement, which computer system comprises at least one central processing unit (CPU) and input/output peripherals comprising:

a display element, means for gaining access to data, and optionally a device for printing data.

The enclosure comprises enclosure means equipped with a door or the like, which enclosure means are intended to house and confine at least one CPU of the computer system. The enclosure further comprises means for locking and unlocking transmission of a signal, which locking/unlocking means are associated with the enclosure means, to neutralize electronic access to the data contained in the computer system.

The means for gaining access to the data are disposed outside of the enclosure. The door or the like has closing means which, upon actuation, actuates the locking means, which locking means have at least one contact controlled by the door or the like of the enclosure. The contact is intended to control a security circuit which comprises a switch disposed in at least one of the links which connect the input/output peripherals to the CPU. The switch is connected so as to neutralize only the means for gaining access and not operation of the CPU.

According to other preferred embodiments of the present invention:

The means for gaining access to data comprise a keyboard;

The enclosure means are designed to also enclose one or more elements associated with the computer system;

The enclosure means are supplied with external connectors which enable connection to at least one peripheral device;

The security circuit is connected to the means for gaining access to the data;

The computer system further comprises a printer element for printing data, disposed outside the enclosure, and the security circuit is connected to this printer element;

The security circuit is connected to the display element;

The security circuit is independent of the computer system;

The security circuit comprises a switch disposed in the link connecting the means for gaining data access to the CPU and;

The door or the like is furnished with mechanical means for locking and unlocking, and electronic control means are associated with these mechanical means.

The invention will be better understood with the aid of the following detailed description of an exemplary embodiment, with reference to the accompanying drawings. The exemplary embodiment is offered for the purpose of illustration and does not limit the scope of the invention.

DETAILED DESCRIPTION OF THE PREFERRED EMBODIMENT

Figure 1:
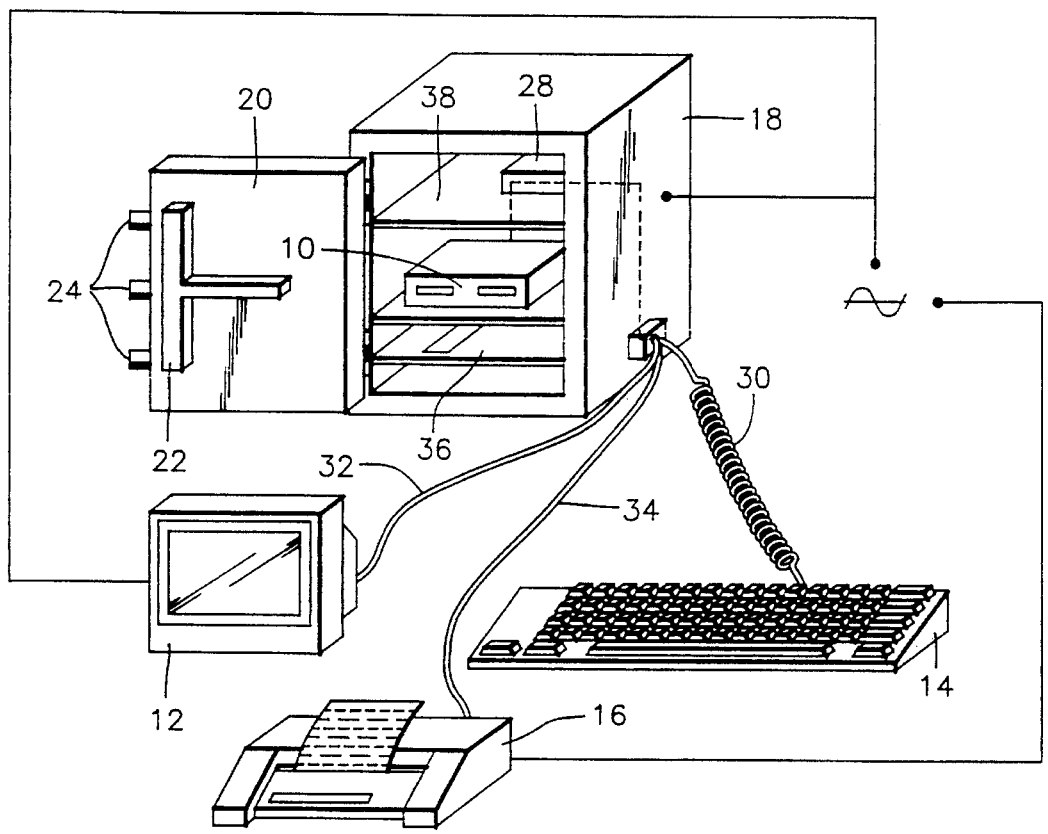
FIG. 1 is a schematic view of an apparatus according to the invention, in an open condition wherein access is permitted to the data contained in the computer system.

The protective apparatus according to the invention is described in the context of a computer system comprised of a CPU 10 having diskette readers, a monitor 12, a keyboard 14, and a printer 16.

The invention comprises protective enclosure means which protect by confinement, wherewith the apparatus comprises an enclosure 18 furnished with a door 20. A CPU 10 is placed inside the enclosure. The video monitor 12, keyboard 14, and printer 16 are disposed outside the enclosure 18.

Of course, one may elect to place the monitor 12 and/or printer 16 in the enclosure 18. However, in an office where space is at a premium and practical considerations are important, the user's keyboard and monitor will be disposed facing him at his work location, and the printer will typically serve a number of work locations in common. Accordingly, it may be preferable to place only the CPU(s) in the enclosure.

The enclosure 18 is furnished with one or more exterior connectors enabling connection to peripheral units. By "peripheral units" here is meant a keyboard, a monitor, a printer, communication lines, etc.

Figure 2:
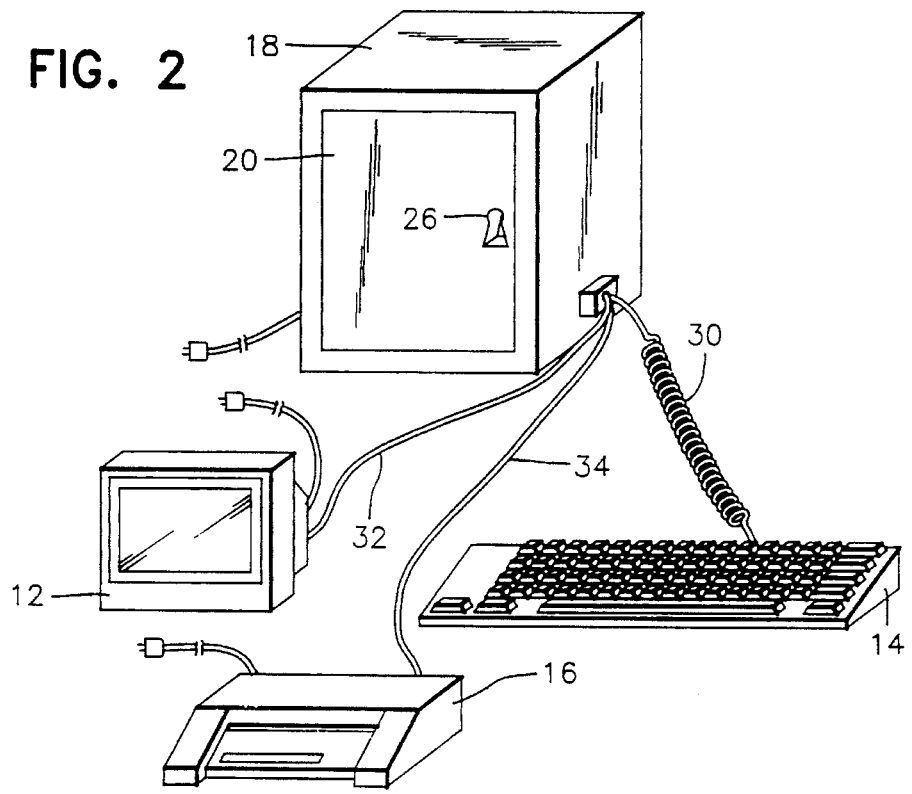
FIG. 2 is a schematic view of an apparatus according to the invention, in a closed condition wherein access to the data contained in the computer system is prevented.

As may be seen from FIG. 1, the door 20 of the enclosure 18 is provided with mechanical locking/unlocking means 22 which are per se known and which comprise means for maneuvering lock bolts 24 and a keyhole 26 shown in FIG. 2.

Contacts are provided which connect to the CPU 10 and to each of the peripherals the use of which peripherals is sought to be controlled at will by the user. At least one contact is provided which is governed by the door 20. The contacts may be of the classical variety or may be optically mediated.

As a result, it is possible to put a security mode into effect by the mere act of closing the door 20. When one closes the door 20 (FIG. 2), the mechanism 22 causes a switch 28 disposed inside the enclosure 18 to be opened, which in turn prevents electronic access to the data contained in the computer system. Thus, the keyboard 14 is disconnected from the CPU 10 by neutralization of the link 30, such that depression of the keys of the keyboard no longer has any effect.

Further, the display on the monitor 12 disappears due to neutralization of the link 32, and the printing of documents is interrupted due to neutralization of the link 34.

In the case described here, a single multipolar switch 28 has been provided, for controlling the keyboard, monitor, and printer simultaneously. It is seen in FIG. 1 that the links 30, 32, and 34 are connected to this single switch.

In alternative embodiments, a plurality of switches may be provided, to control certain functions selectively. In certain cases, for example, one may not wish to neutralize anything more than the keyboard. This enables interdiction of access to information while still allowing printing of data and/or of operating messages on the monitor.

One might mention here that the neutralization is only for low-current links (lines 30, 32, and 34), and not for the power lines themselves of the peripherals. The advantage of this is that it avoids loss of time due to a restart of the peripherals, e.g. warmup of the monitor before a display can appear thereon.

Finally, when the reverse manipulations are performed (unlocking of the lock 26 by means of a key, e.g. a plunger-type key), the door 20 (FIG. 1) is opened and thereby access to data is reestablished. This signifies that the CPU 10 is again physically and electronically accessible, and in particular that operations can be commanded by actuating elements of the keyboard 14. Further, if the monitor 12 and printer 16 have been neutralized, the display of data and the printing functions are reestablished.

Moreover, programs started before the enclosure 18 was closed can be continued without interruption during the security mode.

Thus, long processing tasks can be carried out without requiring the presence of the user and without risking accessibility of the computer system to malefactors or unauthorized persons.

Moreover, the neutralization of the display of information on the monitor deprives an interloper of the information and prevents him from fraudulently operating the keyboard. Consequently the results of such computer operation will not be disclosed to the interloper, nor will any data, even if he does succeed in accessing programs and/or data records.

The invention affords the advantage of being a simple and total solution, in that when the computer system is placed in the security mode by closing the door it still allows continuation of processing already in progress, initiation of certain processes such as making a back-up copy of work in progress or termination of work previously started, or other commands specific to the program employed.

Consequently, one can automatically initiate the security mode for the computer system data even if the user is in a hurry to leave, because the user's only necessary act is to simply close the door of the enclosure, and no other specific precautions with respect to the computer system are required.

Other means may be employed to control locking and unlocking of the door 20 of the enclosure 18. For example, electronic means such as magnetic cards or combinations such as those used on safes could be used. Depending on the importance of the information contained in or accessible by the computer system, one may prefer not to employ external means which can be readily compromised, for example, by a spotter, or by use of mnemonic aids for remembering a combination. In particular, this would be done in order to reduce the risk of loss, theft, or unauthorized use of the information (particularly such use as would not be subsequently be detected by an authorized user).

Generally, the locking means and/or neutralizing means used are advantageously of a type which is quick and easy to implement by the authorized persons.

A security circuit was described above which comprises a switch; however, other known types of security circuits may be adapted to the inventive apparatus.

Depending on the application of the invention, one may use a security circuit which is completely independent of the computer system in question or one which functions by means of the computer system.

The examples given hereinabove are in no way exhaustive, and, depending on the requirements presented and the means at hand, one skilled in the art may adapt the protection to be more or less complex and/or more or less selective. The inventive apparatus is modifiable according to the particular needs of the user.

In order to avoid disconnecting the cables connecting the protected computer system to the selected peripherals when the door 20 is closed, advantageously one may provide interior channels for passage of connecting cables to the peripherals. Preferably, the configuration of these channels is in a "U" shape, and preferably obstacles, such as crimping plates, are provided to prevent the introduction of various objects from the exterior, incursions of fluid or fire, etc.

With the aim of improving the protection of the computer system against aggression by external influences, there is additionally provided a ventilation means which brings in, for example, external air, passes it through a filter, and blows it into the bottom of the interior of the enclosure 18, thereby maintaining the enclosure at a slight overpressure with respect to the surroundings when the door 20 is open in order to limit the entrance of dust. This overpressure may also be used for other purposes. Contrary to the exemplary embodiment described above, there may be cases when one does not want automatic or embodiment closing of the door. In such cases, the overpressure prevents accidental closing of the door.

It is known that computer hardware and its components are sensitive to heat and to temperature variations. Accordingly, in order to maintain an atmosphere which is as stable as possible, the external air drawn in is blown into the interior of the enclosure 18 through a cooling grid (not shown) of a cooling unit which has its exhaust heat exchanger located outside the enclosure 18. One may also provide a flexible tube permitting intake of cold air at a distant point, for example, in a ventilation conduit of a technical station containing the network servers. Other temperature control means may be associated with the enclosure 18 as well.

The enclosure 18 may also be shielded with cladding or the like, or may be constructed with fire resistant materials. Further, it may contain means for automatically detecting fire, which means, for example, shut off the electrical power to the equipment associated therewith when there is smoke in the enclosure, and which in a separate phase actuate firefighting means such as cylinders containing carbon dioxide, other inert gas, or other fluid media, in accordance with applicable regulations.

One may also supply the walls of the enclosure 18 with decorative panels in order to meet aesthetic criteria which are often important in work environments, particularly in offices. The enclosure 18 may also be hidden, for example, under a desk.

Shelves (36, 38) are provided in the interior of the enclosure 18, above and below the CPU 10, respectively, to accommodate elements associated with the computer system, such as diskettes, operating manuals, confidential documents, programs, safeguards, source codes, and listings. Of course, other elements may be stored as well, depending on the needs of the user.

Depending on the location or situation of the computer system, the risks faced, and the degree of protection desired, the enclosure 18 may be equipped with additional optional accessories. Thus, one may provide means on the walls of the enclosure which facilitate attachment of the entire enclosure by one or more points to fixed exterior structures, such as floors, walls, chassis, etc.

The exterior of the enclosure may also have signaling means of various types employing luminous or audible signals to indicate, e.g., that the enclosure is supplied with electric power or ventilation, that the temperature of the outlet air is excessive, that smoke or incipient fire is present, etc.

The inventive apparatus provides the following advantages:

It provides means for protection which are effective while being simple, easy, and fast to implement, and which enable the operator to gain access in a single manipulation to the use of the computer and all of the related support components;

The protection can be actuated without interrupting operations in progress, contrary to the situation with most apparatuses and means in the prior art. Consequently, when the door is reopened the computer system is restored to its prior state which prevailed before the door was closed, with the exception of operations in progress which were allowed to continue during the absence of the operator;

Actuation of the apparatus does not require a significant amount of time, nor does it require complex procedures. Because of the greatly reduced number of manipulations compared to prior known apparatuses, the invention avoids the risk that the protection will tend to be used only sporadically (e.g., only in cases of prolonged absence of the user). Thus the invention constitutes an inducement for the user to store sensitive materials and to pursue security measures;

The inventive apparatus can be installed at the time the computer system itself is installed, or in an existing computer installation. In the latter case, adaptation of the inventive apparatus does not present particular costs above those for other apparatuses which are less effective;

The apparatus does not occupy space which encroaches upon the usual work space because the apparatus is integrated into the usual work space. In addition, it provides a secure storage space which can accommodate other objects which are customarily poorly protected;

The reliability of the computer hardware is enhanced by decreasing its exposure to dust, thermal shock, etc., such that deterioration of the computer hardware due to soiling is substantially limited.

In the security mode, only the parts not containing data remain accessible;

The working conditions for the user can be improved by reducing the amount of noise from the computer, improvement in tidiness, etc.;

From the practical and general characteristics of the inventive apparatus, its effectiveness, and the continuing strong growth of the microcomputer sector, one may predict that the inventive apparatus can and will be economically fabricated in serial production, resulting in low capital cost for the user;

Because of the inaccessibility of the peripherals for entering data and commands, and particularly the neutralization of the functions of the keyboard disposed externally of the enclosure and the neutralization of the monitor (which serves to "blind" an unauthorized person), the protected information itself is inaccessible, and any unauthorized manipulation, particularly infection with a virus, is made impossible;

The level of security provided for data is the same regardless of the data storage medium (hard disk, diskettes, volatile memory, written documents, etc.).

I claim:

1. A protective enclosure for a computer system, to protect said computer system by confinement, which computer system comprises at least one central processing unit (CPU) and input/output peripherals comprising at least two of
 a display element,
 means for gaining access to data, and
 a printer device for printing data,
wherein said protective enclosure comprises:
 enclosure means equipped with a door or the like, which enclosure means house and confine at least one of said at least one CPU of said computer system, and
 means for locking and unlocking transmission of a signal, which locking/unlocking means are associated with said enclosure means, to neutralize electronic access to the data contained in the computer system,
wherein said means for gaining access to the data are disposed outside the enclosure;
 said door or the like having closing means which, when actuated, actuates said means for locking/unlocking, said means for locking/unlocking having at least one contact controlled by the door or the like of said enclosure, said contact being arranged so as to control a security circuit, said security circuit comprising a switch disposed in at least one of a plurality of links which connect said input/output peripherals to the CPU, such that when said closing means is closed said switch neutralizes only the means for gaining access to data and not operation of the CPU.

2. An apparatus according to claim 1; wherein the means for gaining access to data comprise a keyboard.

3. An apparatus according to claim 1; wherein the enclosure means are designed so as to accommodate and also enclose one or more elements associated with the computer system.

4. An apparatus according to claim 1; wherein the enclosure means include exterior connectors which enable connection to at least one peripheral device.

5. An apparatus according to claim 1; wherein the switch is disposed in CPU to a line connecting the means for gaining access to data in the CPU.

6. An apparatus according to one of claims 1–4; characterized in that the door (20) or the like is furnished with mechanical means of locking and unlocking (22), and electronic control means are associated with these.

7. An apparatus according to one of claims 1–6; characterized in that the switch (28) is disposed in the link (30) connecting the means of data access (14) to the CPU (10).

* * * * *